United States Patent [19]

Nakagawa

[11] Patent Number: 4,870,845

[45] Date of Patent: Oct. 3, 1989

[54] WORKING APPARATUS FOR CRANKSHAFT

[75] Inventor: Kiyoshi Nakagawa, Kyoto, Japan

[73] Assignee: Mitsubishi Jidosha Kogyo Kabushiki Kaisha, Tokyo, Japan

[21] Appl. No.: 138,588

[22] Filed: Dec. 28, 1987

[30] Foreign Application Priority Data

May 2, 1986 [JP] Japan ................. 61-102261

[51] Int. Cl.⁴ .......... B21K 1/08; B21D 55/00
[52] U.S. Cl. ............................ 72/1; 72/81; 72/110
[58] Field of Search ............ 72/1, 19, 21, 81, 107, 72/110; 29/6

[56] References Cited

U.S. PATENT DOCUMENTS

| | | | |
|---|---|---|---|
| 3,564,883 | 2/1971 | Koors et al. | 72/19 |
| 4,167,106 | 9/1979 | Berstein et al. | 72/108 |
| 4,485,537 | 12/1984 | Berstein et al. | 72/110 |
| 4,509,351 | 4/1985 | Rolin et al. | 72/19 |
| 4,559,798 | 12/1985 | Hayashi et al. | 72/110 |
| 4,561,276 | 12/1985 | Berstein | 72/110 |

FOREIGN PATENT DOCUMENTS

| | | | |
|---|---|---|---|
| 1959380 | 6/1970 | Fed. Rep. of Germany | 72/21 |
| 11867 | 2/1978 | Japan | 72/21 |
| 85618 | 5/1982 | Japan | 72/82 |

Primary Examiner—Robert L. Spruill
Attorney, Agent, or Firm—Hedman, Gibson, Costigan & Hoare

[57] ABSTRACT

A working apparatus for working a crankshaft having a journal portion and a crank pin includes first and second follow-up mechanisms. The first follow-up mechanism has first and second support members for rotatably clamping the journal portions therebetween. The second support member is moved in relation to the first support member by a first actuator. The second follow-up mechanism has third and fourth support members for rotatably clamping the crank pin therebetween. The fourth support member is moved in relation to the third support member by a second actuator. A first fillet roller is provided at the first support member and pressed against the journal portion, to roll thereon, and a second fillet roller is provided at the third support member and pressed against the crank pin, to roll thereon. The pressure contact of the first and second fillet rollers, with respect to the journal portion and the crank pin, is detected by detecting the displacement of the first and second actuators, respectively, and is controlled by actuating the actuators in response to the detecting signal.

6 Claims, 5 Drawing Sheets

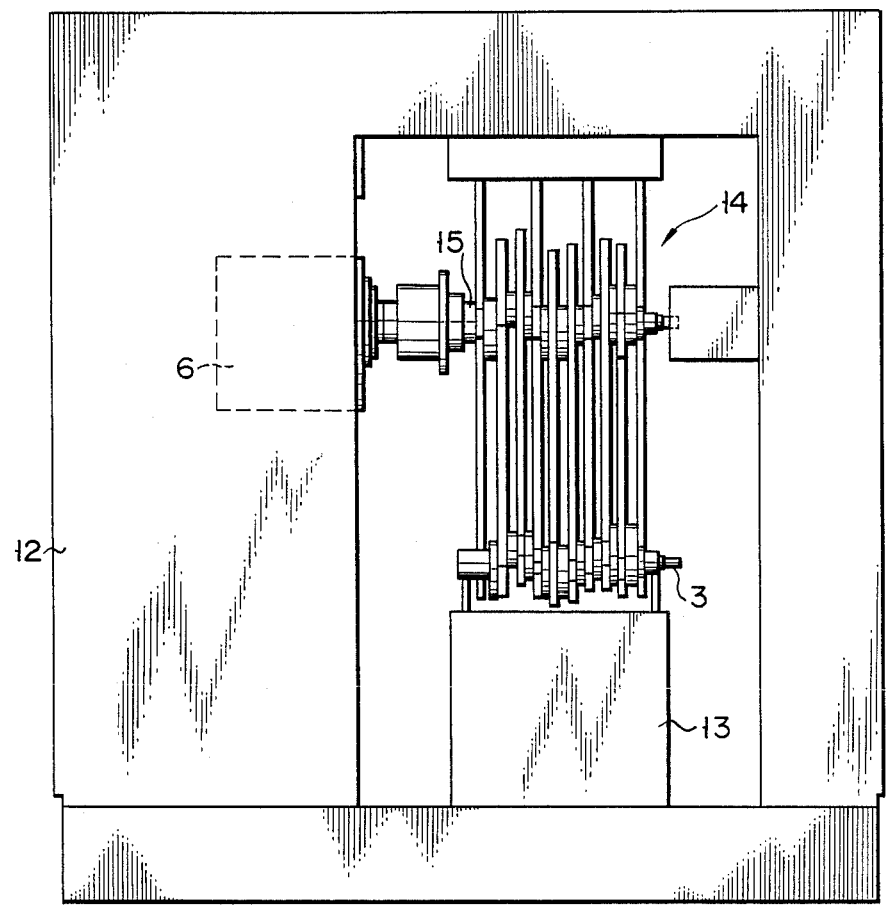
F I G. 1
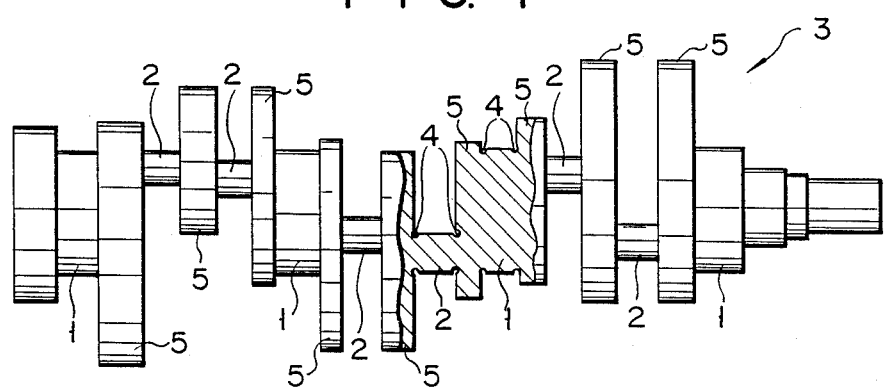
F I G. 2

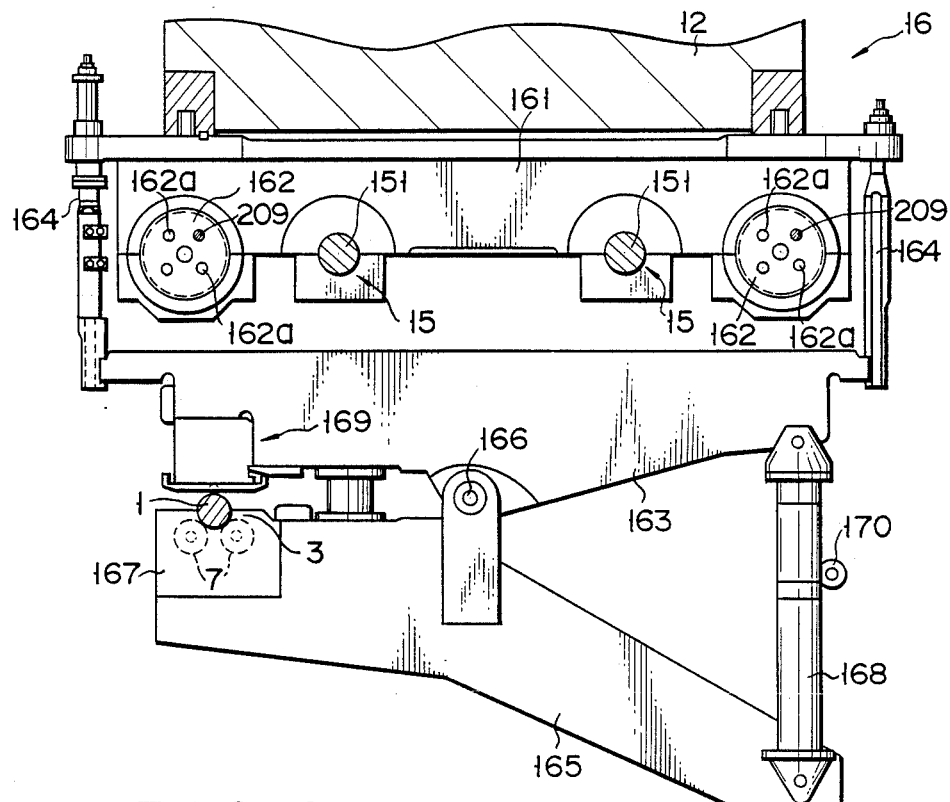
F I G. 4
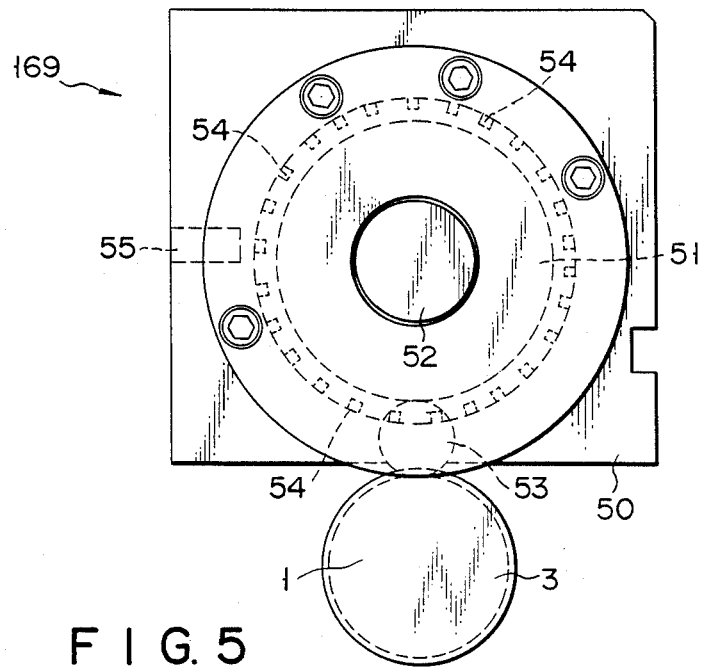
F I G. 5

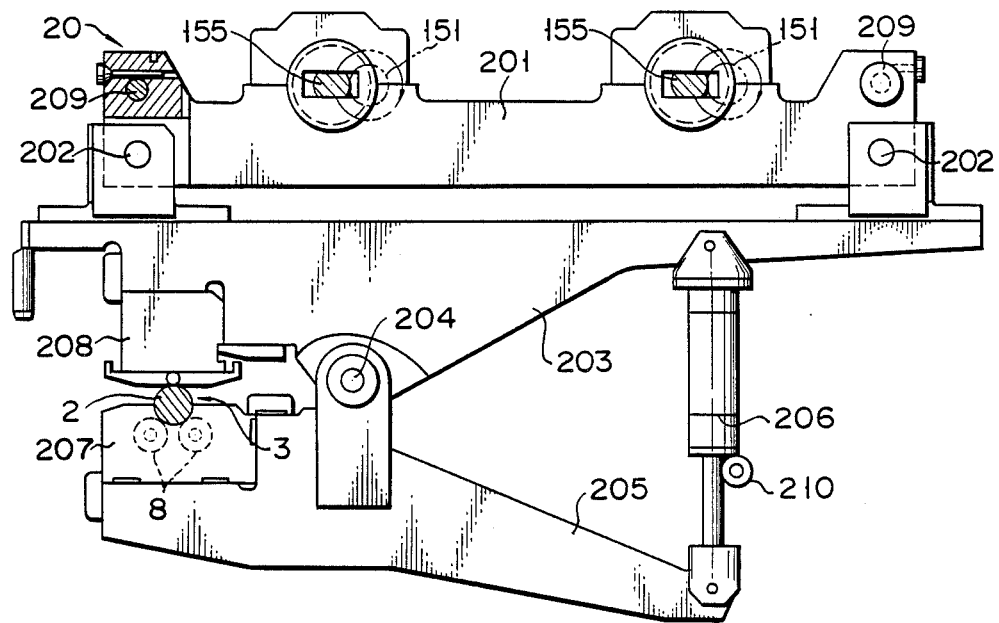
F I G. 8
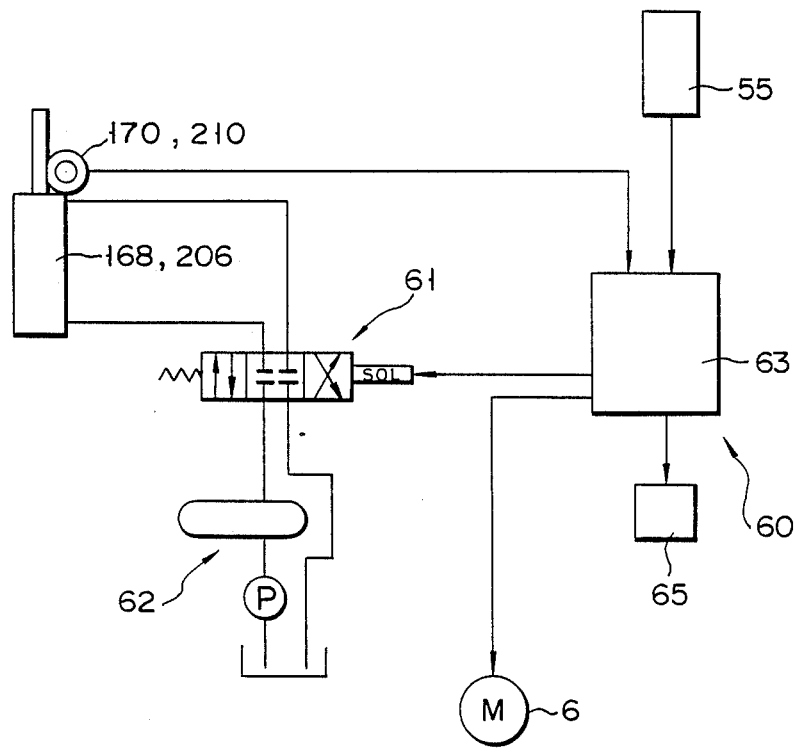
F I G. 9

WORKING APPARATUS FOR CRANKSHAFT

BACKGROUND OF THE INVENTION

The present invention relates to a working apparatus for a crankshaft used in a car engine, and more particularly, to a working apparatus for a crankshaft, adapted to work those portions of the crankshaft which are subject to stress concentration.

Engine crankshafts generally comprise journal portions, crank arms, and crank pins. When a crankshaft rotates, stress concentrates on those corner portions of the journal portions and crank pins which adjoin the crank arms. Accordingly, these corner portions are work-hardened to be improved in mechanical strength by means of a working apparatus.

The working apparatus of this type comprises receiving rollers, used to support the crankshaft, and fillet rollers, which are pressed against the corner portions of the journal portions and the crank pins by means of a drive mechanism. The fillet rollers are rotated by rotating the crankshaft supported by the receiving rollers. In this manner, the corner portions are work-hardened.

In the prior art working apparatus, however, the pressure applied to the corner portions by the fillet rollers can be detected simply as a load by means of load cells and the like. Thus, the corner portions cannot enjoy a constant pressure, so that the worked crankshaft is subject to variation in hardness and therefore, is low in reliability.

SUMMARY OF THE INVENTION

The present invention has been contrived in consideration of these circumstances, and it is an object of the invention to provide a working apparatus for a crankshaft of high reliability, which can work workable portions of a crankshaft for a predetermined hardness, and in which the state of rotation of fillet rollers can be detected.

In order to achieve the above object, a working apparatus of the invention comprises a first follow-up mechanism including first and second support members for clamping the journal portion therebetween to be rotatable, the second support member being arranged to be movable relative to the first support member; a second follow-up mechanism including third and fourth support members for clamping the crank pin therebetween to be rotatable, the fourth support member being arranged to be movable relative to the third support member; a first actuator provided between the first and second support members, for controlling the position of the second support member relative to the first support member; a second actuator provided between the third and fourth support members, for controlling the position of the fourth support member relative to the third support member; a first fillet roller provided on the first support member and pressed against the journal portion to roll on a peripheral surface of the journal portion; a second fillet roller provided on the third support member and pressed against the crank pin to roll on a peripheral surface of the crank pin; a drive mechanism for rotating the second follow-up mechanism to rotate the crankshaft; detecting means for detecting the pressure contact of the first and second fillet rollers; and a control device for actuating the first and second actuators in response to a signal from the detecting means so as to control the pressure contact of the first and second fillet rollers.

BRIEF DESCRIPTION OF THE DRAWINGS

FIGS. 1 to 9 show a working apparatus according to an embodiment of the present invention, in which:

FIG. 1 is a side view schematically showing the whole apparatus;

FIG. 2 is a side view of a crankshaft to be worked by means of the apparatus of FIG. 1;

FIG. 3 is a plan view of a working mechanism;

FIG. 4 is a side view taken along line IV—IV of FIG. 3;

FIGS. 5 and 6 are a side view and a sectional view, respectively, of a pressure block;

FIG. 7 is an enlarged view showing part of a fillet roller;

FIG. 8 is a side view taken along line VIII—VIII of FIG. 3; and

FIG. 9 is a circuit diagram of a control device.

DETAILED DESCRIPTION OF THE PREFERRED EMBODIMENT

Figure 3:
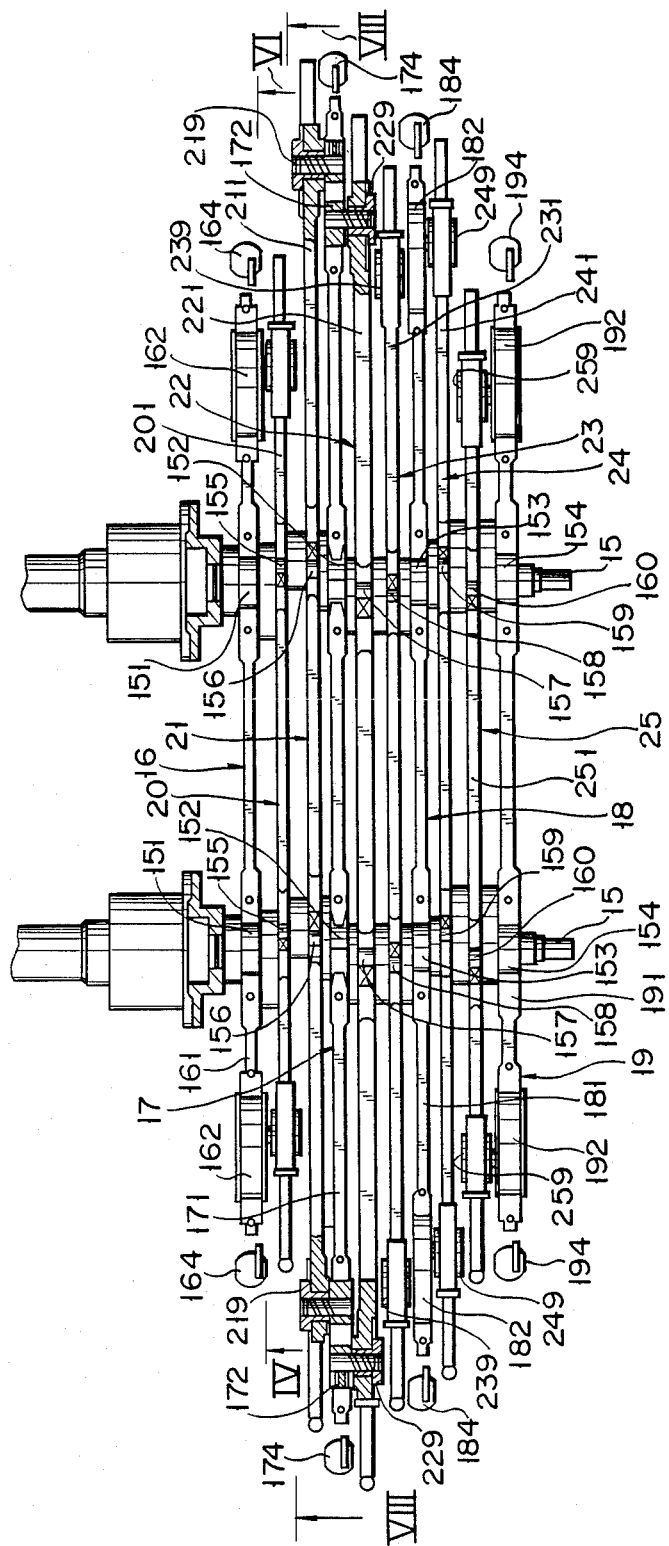

An embodiment of the present invention will now be described in detail with reference to the accompanying drawings.

As is shown in FIG. 1, a working apparatus comprises frame 12, support base 13 fixed to the frame and supporting crankshaft 3 as a workpiece, and working mechanism 14 supported on the frame, for working the crankshaft.

In this embodiment, as is shown in FIG. 2, crankshaft 3 includes four journal portions 1, six crank pins 2, and a plurality of crank arms 5 located between portions 1 and pins 2. Corner portions 4, situated between portions 1 and arms 5 and between pins 2 and arms 5, are worked on the working apparatus.

As is shown in FIGS. 1, 3 and 4, working mechanism 14 includes two master crankshafts 15 which are rotatably supported parallel to one another on frame 12. Each master crankshaft 15 has the same construction as crankshaft 3. More specifically, crankshaft 15 has four journal portions 151, 152, 153 and 154 and six crank pins 155, 156, 157, 158, 159 and 160. Each master crankshaft 15 is rotated about its own central axis by means of motor 6 as a drive source provided inside frame 12.

Working mechanism 14 also includes first through fourth follow-up mechanisms 16, 17, 18 and 19, which act on the journal portions of master crankshafts 15 and crankshaft 3, and fifth through tenth follow-up mechanisms 20, 21, 22, 23, 24, and 25, which act individually on the crank pins.

First follow-up mechanism 16, as a representative of the first through fourth follow-up mechanisms, will now be described in detail.

As is shown in FIGS. 3 and 4, follow-up mechanism 16 includes clamp member 161 which is fixed to frame 12 and clamps its corresponding journal portions 151 of master crankshafts 15 for rotation. Disk 162 is disposed inside each of left and right end portions of member 161. It is rotatable around an axis and parallel to the axis of each crankshaft 15. Disk 162 has four coupling holes 162a arranged at regular intervals around the central axis thereof. Lift mechanisms 164 are disposed individually at two opposite ends of clamp member 161. Upper support member 163 is suspended substantially parallel to member 161 by means of mechanisms 164. Lower support member 165 is rockably supported on member 163 by means of pin 166. Support block 167 is formed at the left-hand end of member 165. It is used to support its corresponding journal portion 1 of the workpiece or crankshaft 3. Block 167 includes a pair of rollers 7 on which journal portion 1 is supported. Hydraulic cylinder 168 is disposed between upper and lower support members 163 and 165 so as to rock member 165 around pin 166. Cylinder 168 is provided with rotary encoder 170 for detecting an extension stroke of cylinder 168. Pressure block 169 is attached to upper support member 163 so as to face support block 167.

Figure 6:
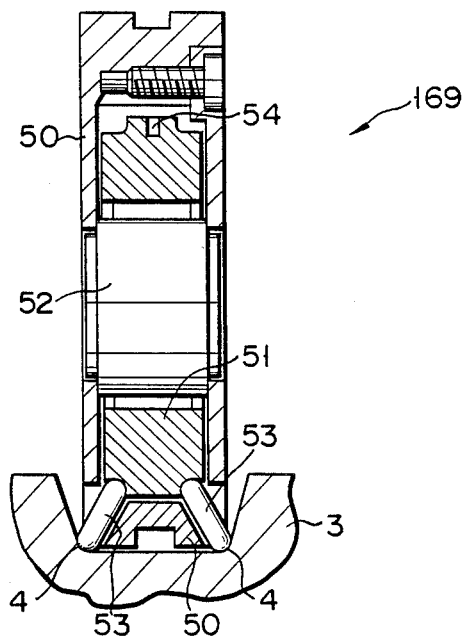
Figure 7:
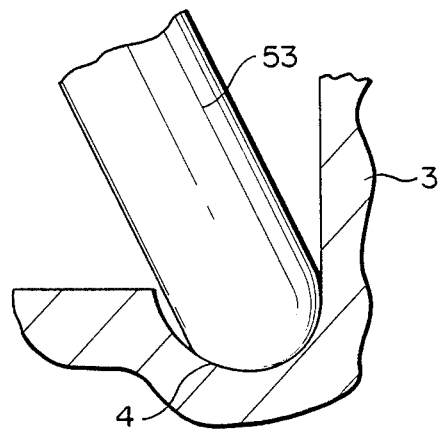

As is shown in FIGS. 5 and 6, pressure block 169 includes case 50, backup roller 51, a pair of fillet rollers 53, recesses 54, and rotating pickup 55. Case 50 is removably attached to upper support member 163. Backup roller 51 is rotatably mounted inside casing 50 by means of support shaft 52. Fillet rollers 53 are rotatably mounted at the bottom end of case 50 so that their lower portions are wider spaced. Rollers 53 are rotated by means of roller 51. Recesses 54 are formed on the outer peripheral surface of backup roller 51, at predetermined intervals along the circumferential direction of roller 51. Pickup 55 is attached to case 50 so as to face one of recesses 54, and serves to detect the recesses passing in front of it. As is shown in FIG. 7, the lower end of each fillet roller 53 is pressed against its corresponding corner portion 4 of journal portion 1.

Second through fourth follow-up mechanisms 17 to 19 are constructed in the same manner as first follow-up mechanism 16. More specifically, mechanisms 17, 18 and 19 include clamp members 171, 181 and 191, disks 172, 182 and 192, and lift mechanisms 174, 184 and 194, respectively. Each of the second through fourth followup mechanisms also includes upper and lower support members, a hydraulic cylinder, a rotary encoder, a support block, and a pressure block.

Fifth through tenth follow-up mechanisms 20 to 25 are constructed substantially in the same manner as first through fourth follow-up mechanisms 16 to 19. As a representative mechanisms 20 to 25, fifth follow-up mechanism 20 will be described. As is shown in FIGS. 3 and 8, mechanism 20 includes clamp member 201 rotatably clamping its corresponding crank pins 155 of master crankshafts 15. Further, mechanism 20 includes upper and lower support members 203 and 205. Member 203 is rockably supported on clamp member 201 by mean of two support pins 202, while member 205 is rockably supported on member 203 by means of pin 204. Support block 207 for supporting its corresponding crank pin 2 of crankshaft 3 is formed a the left-hand end of member 205. Block 207 includes a pair of rollers 8 on which the crank pin is supported. Hydraulic cylinder 206 is disposed between upper and lower support members 203 and 205. It serves to rock member 205 around pin 204. Cylinder 206 is provided with rotary encoder 210 for detecting an extension stroke of cylinder 206. Pressure block 208 is removably attached to upper support member 203 so as to face support block 207. It is constructed in the same manner as pressure block 169 of first follow-up mechanism 16.

Moreover, coupling pins 209 are provided individually at two opposite ends of the top portion of clamp member 201. Each pin 209 is fitted in one of four coupling holes 162a formed in its corresponding disk 162 of clamp member 161 of first follow-up mechanism 16, as is shown in FIGS. 3 and 4. Pin 209 in hole 162a is situated in a position such that fifth follow-up mechanism 20 is accurately in alignment with the trajectories of crank pins 155 when master crankshafts 15 rotate about their own axes.

Sixth through tenth follow-up mechanisms 21 to 25 are constructed in the same manner as fifth follow-up mechanism 20. More specifically, mechanisms 21, 22, 23, 24 and 25 include clamp members 211, 221, 231, 241 and 251, respectively. Each of the sixth through tenth follow-up mechanisms also includes upper and lower support members, a hydraulic cylinder, a rotary encoder, a support block, and a pressure block. As is shown in FIG. 3, moreover, coupling pins 219 and 229 of sixth and seventh follow-up mechanisms 21 and 22 are coupled to disks 172 of second follow-up mechanism 17, while coupling pins 239 and 249 of eighth and ninth follow-up mechanisms 23 and 24 are coupled to disks 182 of third follow-up mechanism 18. Coupling pins 259 of tenth follow-up mechanism 25 is coupled to disks 192 of fourth follow-up mechanism 19.

As is shown in FIG. 9, control device 60 of the working apparatus comprises electromagnetic valve 61 for controlling oil pressure, oil-pressure source 62 for supplying oil pressure to valve 61, and control unit 63 for delivering a control signal to valve 61. Valve 61 serves to control the extension and contraction of oil hydraulic cylinders 168 and 206 of first through fourth follow-up mechanisms 16 to 19 and fifth through tenth follow-up mechanisms 20 to 25. Control unit 63 receives signals from rotary encoders 170 and 210 attached to cylinders 168 and 206, and rotation signals from rotation pickups 55 of pressure blocks 169 and 208. Unit 63 is also supplied, from a crankshaft sensor (not shown), with a signal which is indicative of the presence of crankshaft 3 on support base 13. Moreover, control unit 63 delivers control signals to valve 61 and motor 6 as a drive source for master crankshafts 15. Unit 63 is connected to alarm device 65.

The operation of the working apparatus with the aforementioned construction will now be described.

First, crankshaft 3 is carried automatically into the working apparatus by means of a conveyor system (not shown), whereupon the crankshaft is placed on support base 13. In this state, hydraulic cylinders 168 and 206 of the individual follow-up mechanisms are contracted, and the support blocks are separated from their corresponding pressure blocks.

Subsequently, the crankshaft sensor automatically detects the arrival of crankshaft 3, and delivers a detection signal to control unit 63. Thereupon, unit 63 performs duty control of electromagnetic valve 61 such that cylinders 168 and 206 are extended. Then, lower support members 165 and 205 of first through fourth follow-up mechanisms 16 to 19 and fifth through tenth follow-up mechanisms 20 to 25 rock in the clockwise direction of FIGS. 4 and 8. Thus, lower support members 165 of mechanisms 16 to 19, in conjunction with upper support members 163, clamp journal portions 1 of crankshaft 3, while lower support members 205 of mechanisms 20 to 25, in conjunction with upper support members 203, clamp crank pins 2. After the clamping is accomplished, cylinders 168 and 206, whose oil pressure is relatively low, are stopped from extending further. This state is detected by control unit 63 when the input signals from rotary encoders 170 and 210 cease to change.

After the clamping is finished, fillet rollers 53 of pressure blocks 169 and 208 are pressed against their corresponding corner portions 4 of journal portions 1 and crank pins 2 of crankshaft 3, as is shown in FIGS. 6 and 7.

Then, control unit 63 performs duty control of electromagnetic valve 61, thereby allowing hydraulic cylinders 168 and 206 to further extend. Thus, fillet rollers 53 bite into corner portions 4. Unit 63 detects the depth of such bite through the medium of rotary encoders 170 and 210, and performs feedback control so that the depth attains a proper value. The moment a control signal is delivered to valve 61, a drive signal is supplied to motor 6, so that the motor starts to rotate.

Thereupon, master crankshafts 15 rotate about their own axes. As a result, crank pins 155 to 160 of master crankshafts 15 circularly move around their corresponding journal portions 151, as indicated by two-dot chain lines in FIG. 8. Thus, fifth through tenth follow-up mechanisms 20 to 25 also circularly move. Since these mechanisms hold the two master crankshafts for rotation, however, clamp members 201 to 251 rotate around journal portions 151 of crankshafts 15 without changing their horizontal posture, as is shown in FIG. 8.

Accordingly, crankshaft 3 is caused to rotate around its journal portions 1 by fifth through tenth follow-up mechanisms 20 to 25.

Thus, corner portions 4 of journal portions 1 of crankshaft 3 are fillet-worked by means of fillet rollers 53 of pressure blocks 169, which hold their corresponding journal portions. While crank pins 2 of crankshaft 3 make one revolution, fifth through tenth follow-up mechanisms 20 to 25 rock together with pins 2. Since these mechanisms maintain the posture shown in FIG. 8, however, crank pins 2 rotate relatively to their corresponding pressure blocks 208. In this manner, corner portions 4 of pins 2 are all fillet-worked by means of fillet rollers 53.

Control unit 63 detects the end of the fillet working by means which detects the rotational frequency of master crankshafts 15 in response to a feedback signal from motor 6.

When the working is finished, hydraulic cylinders 168 and 206 are contracted in response to a signal from control unit 63, thereby releasing crankshaft 3. Thus, crankshaft 3 is placed on support base 13, whereupon it is automatically carried to the next step by the conveyor system (not shown).

If the oil pressure, supplied to hydraulic cylinders 168 and 206 during the fillet working, is low, and if the bite of fillet rollers 53 in corner portions 4 is not very deep, action stroke signals, delivered from rotary encoders 170 and 210 to control unit 63, cannot attain a predetermined level. Accordingly, control unit 63 controls valve 61 so as to increase the oil pressure supplied to cylinders 168 and 206 and the depth of the bite of rollers 53 in corner portions 4. This control operation is continued until the depth of the bite attains a predetermined value.

When fillet rollers 53 are not rotating, their corresponding rotation pickup 55 notifies control unit 63 of this state through the medium of backup roller 51. Unit 63 actuates alarm device 65, thereby informing an operator of the nonoperating state of rollers 53. A the same time, the control unit stops motor 6 and causes hydraulic cylinders 168 and 206 to contract, so that crankshaft 3 is placed on support base 13. Thereupon, the conveyor system detects this and carries crankshaft 3 from the working apparatus, regarding the crankshaft as a defective.

As described above, control unit 63 continually detects the depth of bite of fillet rollers 53 in corner portions 4, in response to the signals from rotary encoders 170 and 210, and performs feedback control of hydraulic cylinders 168 and 206. Accordingly, the depth of the bite in corner portions 4 of crankshaft 3 can be kept at a predetermined value, so that the corner portions can be securely work-hardened without suffering from defective workings.

When rotation pickups 55 detect the nonrotating state of fillet rollers 53, an alarm is given, signaling that something is wrong with pressure blocks 169 and 208. Accordingly, defectives can be securely rejected, and blocks 169 and 208 can be repaired immediately after the occurrence of trouble. Thus, production of many defectives can be prevented.

What is claimed is:

1. A working apparatus for working a crankshaft having a journal portion and a crank pin, comprising:
   a first follow-up mechanism comprising first and second support members for clamping the journal portion therebetween so as to be rotatable, the second support member being arranged so as to be movable in relation to the first support member;
   a second follow-up mechanism comprising third and fourth support members for clamping the crank pin therebetween in order to be rotatable, the fourth support member being arranged so as to be movable in relation to the third support member;
   a first actuator provided between the first and second support members and comprising a movable member, for controlling the position of the second support member relative to the first support member;
   a second actuator provided between the third and fourth support members and comprising a movable member, for controlling the position of the fourth support member relative to the third support member;
   a first fillet roller provided on the first support member and pressed against the journal portion, to roll on a peripheral surface of the journal portion;
   a second fillet roller provided on the third support member and pressed against the crank pin, to roll on a peripheral surface of the crank pin;
   a drive mechanism for rotating the second follow-up mechanism, to rotate the crankshaft;
   detecting means for detecting the displacement of the movable members, to thereby determine the change in the displacement of the first fillet roller with respect to the journal portion, and also the change in the displacement of the second fillet roller with respect to the crank pin; and
   a control device for actuating the first and second actuator in response to a signal from the detecting means so as to control the pressure contact of the first and second fillet rollers.

2. An apparatus according to claim 1, wherein said first actuator comprises a first hydraulic cylinder for moving the second support member towards and away from the first support member, and said second actuator comprising a second hydraulic cylinder for moving the fourth support member towards and away from the third support member.

3. An apparatus according to claim 2, wherein said detecting means further comprises sensors for detecting a movement stroke of the first and second hydraulic cylinders, thereby detecting the change in the displacement of the first fillet roller with respect to the journal portions, and also the change in the displacement of the second fillet roller with respect to the crank pin.

4. An apparatus according to claim 3, wherein said control device comprises an oil-pressure source for supplying oil pressure to the first and second hydraulic cylinders, and valve means for controlling oil pressure to be received from the oil-pressure source by the first and second hydraulic cylinders.

5. An apparatus according to claim 1, wherein said detecting means further comprises sensors for detecting rotation of the first and second fillet rollers, and said control device stops the drive mechanism when the sensors detect a state wherein the first or second or both the first and second fillet rollers are not rotating.

6. An apparatus according to claim 1, wherein said drive mechanism comprises a pair of master crankshafts each having the same construction as that of the crankshaft to be worked, the journal portions of the master crankshafts being rotatably supported by the first follow-up mechanism and the crank pins of the master crankshafts being rotatably supported by the second follow-up mechanism, and a drive source for rotating the master crankshafts so as to rotate the second follow-up mechanism.

* * * * *

UNITED STATES PATENT AND TRADEMARK OFFICE
CERTIFICATE OF CORRECTION

PATENT NO. : 4,870,845
DATED : October 3, 1989
INVENTOR(S) : Kiyoshi Nakagawa

It is certified that error appears in the above-identified patent and that said Letters Patent is hereby corrected as shown below:

Title page, item [30] pertaining to foreign application priority data delete in its entirety.

Signed and Sealed this

Second Day of October, 1990

Attest:

HARRY F. MANBECK, JR.

Attesting Officer  Commissioner of Patents and Trademarks